United States Patent [19]
Kuromoto

[11] Patent Number: 5,823,369
[45] Date of Patent: Oct. 20, 1998

[54] CONTROL DEVICE FOR AUTOMATICALLY STOPPING SWIVELING OF CRANES

[75] Inventor: Kazunori Kuromoto, Yokohama, Japan

[73] Assignee: Kabushiki Kaisha Komatsu Seisakusho, Japan

[21] Appl. No.: 612,871

[22] PCT Filed: Sep. 9, 1994

[86] PCT No.: PCT/JP94/01496

§ 371 Date: Mar. 11, 1996

§ 102(e) Date: Mar. 11, 1996

[87] PCT Pub. No.: WO95/07231

PCT Pub. Date: Mar. 16, 1995

[30] Foreign Application Priority Data

Sep. 9, 1993 [JP] Japan ................................. 5-224658

[51] Int. Cl.⁶ .................................................. B66C 13/04
[52] U.S. Cl. .......................................... 212/273; 212/223
[58] Field of Search ..................... 212/273, 272, 212/275, 223

[56] References Cited

FOREIGN PATENT DOCUMENTS

| 52-88956 | 7/1977 | Japan . |
| 2-3518 | 1/1990 | Japan . |
| 3-18596 | 1/1991 | Japan . |
| 3-177299 | 8/1991 | Japan . |
| 5-278993 | 10/1993 | Japan . |

*Primary Examiner*—Thomas J. Brahan
*Attorney, Agent, or Firm*—Greer, Burns & Crain, Ltd.

[57] ABSTRACT

A device which comprises first calculating means for calculating a lower-limit time Tmin of swiveling control on the basis of dynamic characteristics of a swiveling angular velocity control system, second calculating means for determining a swinging period T of the suspended load, third calculating means for selecting a smallest natural number n for which $nT \geq Tmin$, and braking and stopping control means for braking and stopping the rotary body with an angular acceleration α indicated by the equation $\alpha = -\Omega O/nT$ (where ΩO is the swiveling angular velocity of the rotary body immediately prior to the initiation of automatic swiveling stopping control), and which eliminates influences of elastic vibrations so as to insure an excellent stopping accuracy.

5 Claims, 6 Drawing Sheets

CONTROL DEVICE FOR AUTOMATICALLY STOPPING SWIVELING OF CRANES

TECHNICAL FIELD

The present invention concerns a control device for automatically stopping the swiveling of cranes, which automatically stops the swiveling operation of a crane which has a suspended load, without any swinging of the load.

BACKGROUND ART

A technique of this type is described in a paper titled "Anti-Swing Control of the Overhead Crane Using Linear Feedback", by A. J. Ridout, Journal of Electrical and Electronics Engineering, Australia—IE Aust. & IREE Aust. Vol. 19, No. ½. In this paper, it is indicated that in cases where the upper end of a pendulum is decelerated at a constant acceleration in a state where there is no swinging of the pendulum, the pendulum can be stopped without swinging if the pendulum is stopped after the time corresponding to the period of the pendulum.

Specifically, in the case of a pendulum consisting of a degree of freedom of linear advance of x and a swinging angle of $\theta$, as is shown in FIG. 7, if there is no swinging of the load under the initial conditions, i. e., if $\theta = d\theta/dt = O$, then, even if x is controlled from that point with a constant acceleration for the time of the period T of the pendulum, there will be no swinging of the load at the end, so that $\theta = d\theta/dt = O$ (see FIG. 8).

In Japanese Patent Application Kokai No. 3-18596, this characteristic of a pendulum is applied to rotary type cranes. The permissible conditions for the angular acceleration of swiveling based on the lateral bending strength of the boom are calculated from the swiveling radius of the suspended load, weight, inertial moment of the boom and permissible load of the boom, and swiveling is braked and stopped at a constant angular acceleration $\beta$ indicated by the following equation.

$$\beta = -\omega \cdot \Omega O / 2n\pi$$

Here, $\Omega O$ is the initial angular velocity of swiveling, $2\pi/\omega$ is the swinging period of the suspended load, and n is the smallest natural number which is such that $\beta$ satisfies the abovementioned permissible conditions.

However, the rotary body and boom of an actual crane are elastic bodies; accordingly, even in the case of an angular velocity which causes no problems in terms of the strength of the boom, there is a possibility that flexing or elastic vibration may be induced in the rotary body or boom by such an angular velocity. Furthermore, if elastic vibration occurs, not only will the angular acceleration at the boom tip position not show a smooth deceleration as desired, but such elastic vibration may actually cause swinging of the suspended load. For example, FIGS. 9 (a) and 9 (b) illustrate cases in which a command for a constantly decelerating angular acceleration from steady swiveling in a suspended-load state at a certain boom attitude has been given. In FIGS. 9 (a) and 9 (b), the deceleration control time is different. In both FIGS. 9 (a) and 9 (b), the decelerating angular acceleration satisfies the boom strength conditions; however, in the case of FIG. 9 (a), where the deceleration time is short, elastic vibration is induced in the rotary body and boom of the crane, so that the boom tip shows considerable vibration. Accordingly, in a crane, the decelerating angular acceleration used to control the angular velocity of the boom tip is governed by the limiting value of the control system controlling the angular velocity of swiveling of the crane which takes such elastic vibration into consideration. In other words, even before the boom root stress reaches the point of yielding, elastic deformation results in a great change in characteristics with respect to the boom tip angular velocity control system, so that the limiting angular acceleration of the rotary body of the crane must be determined from the dynamic characteristics of the swiveling speed control system including such elastic deformation.

The present invention was designed in the light of such facts; the object of the present invention is to provide a control device for automatically stopping the swiveling of cranes which eliminates the effects of elastic vibration and thus insures good stopping precision.

DISCLOSURE OF THE INVENTION

The present invention is characterized by the fact that in a crane in which a boom is attached to a rotary body, and a load is suspended from a specified position on the boom, there are provided first calculating means which calculates a lower-limit time Tmin of swiveling control on the basis of dynamic characteristics of a swiveling angular velocity control system, second calculating means which determines a swinging period T of the suspended load, third calculating means which selects a smallest natural number n for which $nT \geq Tmin$, and braking and stopping control means which brakes and stops the rotary body with an angular acceleration $\alpha$ indicated by the following equation:

$$\alpha = -\Omega O / nT$$

($\Omega O$: a swiveling angular velocity of the rotary body immediately prior to the initiation of automatic swiveling stopping control).

In such a constitution of the present invention, the permissible conditions are calculated on the basis of the dynamic characteristics of the swiveling speed control system with respect to the period T of the suspended load, and the swiveling of the boom is braked and stopped with an angular acceleration indicated by $\alpha = \Omega O / nT$.

Accordingly, in the present invention, automatic stopping control of the tip portion of the crane boom, which is formed from elastic structural bodies exhibiting complicated vibrational behavior, can be realized without complicated calculations and without considering the lateral bending strength of the boom. Furthermore, the effects of elastic vibration can be eliminated from the control results, so that good stopping precision is insured.

BEST MODE FOR CARRYING OUT THE INVENTION

Below, the present invention will be described in detail in terms of the embodiment illustrated in the attached figures.

First, the swiveling drive system of the crane will be considered in terms of a mathematical model.

Figure 2:
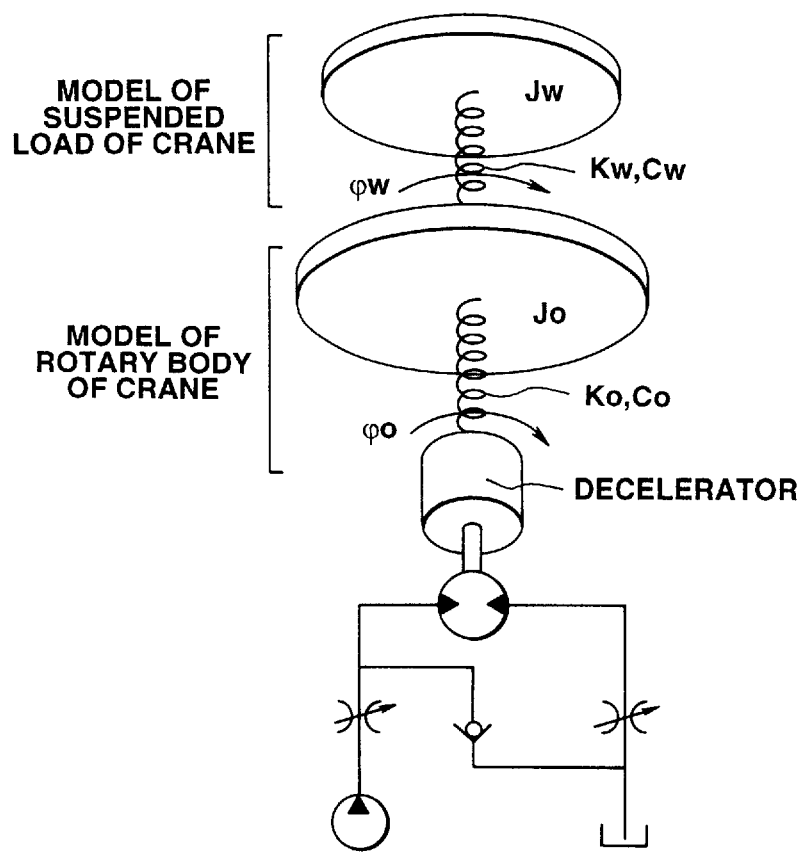
FIG. 2 is a diagram which shows a model of the swiveling drive system during crane deceleration.

FIG. 2 shows a model of the swiveling drive system during crane deceleration.

Specifically, in FIG. 2, the two rotational motions of the suspended load and the rotary body of the crane are considered, and these two rotating bodies are considered to be connected to the drive part (using a hydraulic motor) by the torsional rigidities Kw and KO and the torsional viscous damping coefficients Cw and CO.

Here,

Jw: an inertial moment of the suspended load,

JO: an inertial moment of the rotary body of the crane,

Kw: a torsional rigidity between the suspended load and the rotary body of the crane, Cw: a torsional viscous damping coefficient between the suspended load and the rotary body of the crane, KO: a torsional rigidity between the rotary body of the crane and the decelerator, CO: a torsional viscous damping coefficient between the rotary body of the crane and the decelerator, $\phi$w: a rotational angle of the suspended load, and $\phi$O: a rotational angle of the rotary body of the crane.

Furthermore, in the drive part which uses a hydraulic motor, qM is the motor capacity, i is the deceleration ratio of the decelerator, and $\eta$t is the torque efficiency of the hydraulic motor+decelerator, and $\Delta$P is the before-and-after pressure differential of the swiveling motor (corresponding to the braking torque). The output torque $\tau$ in this case is as follows:

$$\tau = (\Delta P \cdot qM \cdot i \cdot \eta t)/200\pi$$

Furthermore, the equation of motion in this case is as indicated by Equation (1) below:

$$\begin{bmatrix} J0 & O \\ O & Jw \end{bmatrix} \begin{bmatrix} \ddot{\phi}0 \\ \ddot{\phi}w \end{bmatrix} + \begin{bmatrix} C0+Cw & -Cw \\ -Cw & Cw \end{bmatrix} \begin{bmatrix} \dot{\phi}0 \\ \dot{\phi}w \end{bmatrix} + \begin{bmatrix} K0+Kw & -Kw \\ -Kw & Kw \end{bmatrix} \begin{bmatrix} \phi0 \\ \phi w \end{bmatrix} = \begin{bmatrix} \tau \\ O \end{bmatrix} \quad (1)$$

Figure 9A:
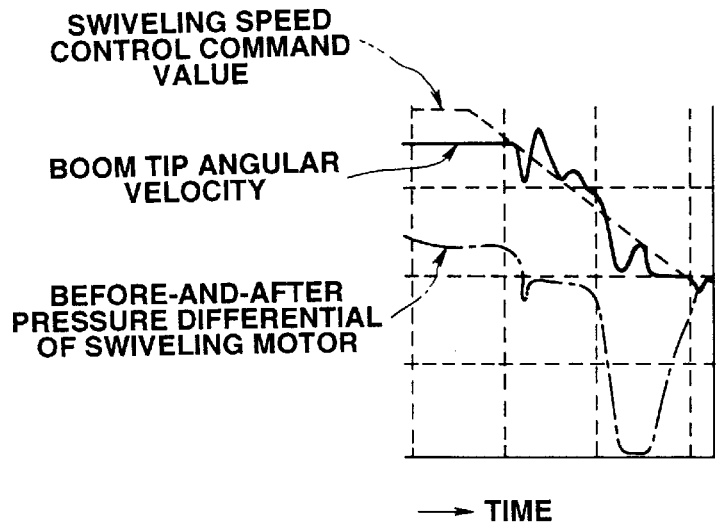
FIGS. 9 (a) and 9 (b) are graphs which show differences in the behavior of elastic vibration according to differences in the deceleration control time.
Figure 9B:
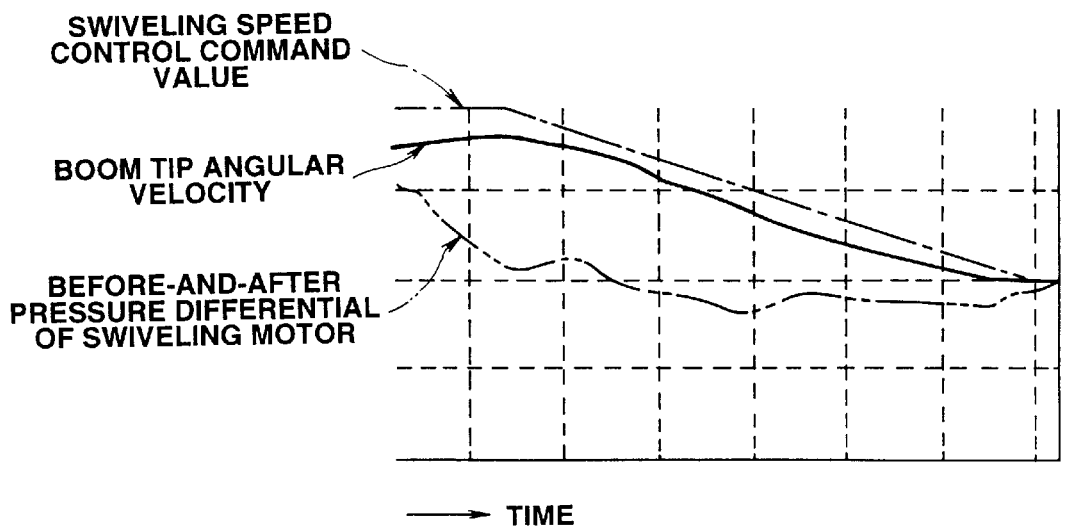

Furthermore, in the case of such a crane speed driving system, control must be performed with the before-and-after pressure differential $\Delta$P of the hydraulic motor taken as the input, and the angular velocity of the boom tip, i. e., the track of d$\phi$O/dt in the case of this model, taken as the target output. As was shown earlier in FIGS. 9 (a) and 9 (b), vibration of the boom tip is observed according to how this target track is obtained. The reason for this is that in Equation (1), the inertia terms JO and Jw are large, while the damping terms CO and Cw and rigidity terms KO and Kw are small, so that the drive system itself has vibrational characteristics. Accordingly, this tendency becomes stronger as the length of the boom increases, as the raising/lowering angle of the boom decreases, or as the weight of the suspended load increases.

In the mathematical model of the crane driving system described above, a vibrational model with two degrees of freedom based on concentrated mass was used for the sake of simplicity. In actuality, however, since these vibrations are elastic vibrations of the structural members of the crane, a model with an infinite number of degrees of freedom based on a continuum must be used. Furthermore, since there is a strong nonlinearity due to mechanical looseness, and since waste time and time delays are generated inside the control parts, it is not easy to construct an analytical model.

Accordingly, in the case of the present device, the following approach is used: i. e., the permissible deceleration time Tmin is determined beforehand by experiment, and in actual automatic stopping control of swiveling, the speed of the rotary body of the crane is controlled so that there is a constantly decelerating angular acceleration over the time nT (based on the relationship that nT, which is obtained by multiplying the swinging period T of the suspended load by the natural number n, is larger than Tmin), thus causing the crane to stop.

In other words, the target angular acceleration $\alpha$ of the rotary body of the crane is given by the equation $\alpha = -\Omega O/nT$. Here, $\Omega O$ is the angular velocity of the rotary body of the crane immediately prior to the initiation of automatic swiveling stopping control, T is the period of the suspended load, and n is the smallest natural number which is such that nT$\geq$Tmin.

Here, according to the present algorithm, the elastic vibrations of the rotary body and boom of the crane during control are naturally suppressed, so that the boom members naturally do not reach the yielding point. Accordingly, there is no need to consider the lateral bending strength conditions of the boom as indicated in the prior art described above. Specifically, by setting the permissible conditions, not depending on the boom strength, but on a restrictive time arising from the dynamic control characteristics, excellent crane stopping control can be achieved without causing damage.

Figure 3:
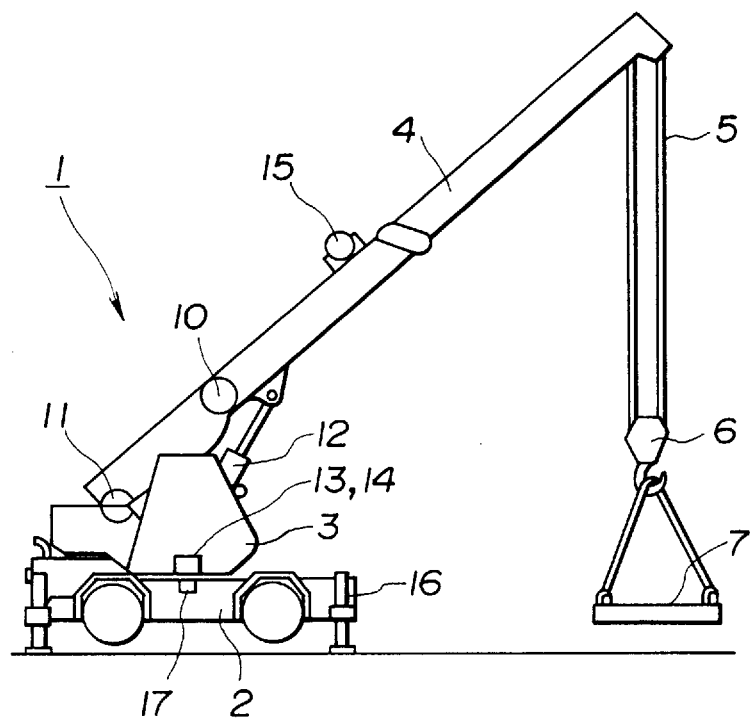
FIG. 3 is a diagram which illustrates the positioning of sensors on the crane.

FIG. 3 shows a vehicular crane 1. 2 indicates a vehicle body, 3 indicates a rotary body, 4 indicates a boom, 5 indicates a rope, 6 indicates a hook, and 7 indicates a suspended load. Furthermore, various types of sensors, i. e., a boom length sensor 10, a boom raising/lowering angle sensor 11, a boom raising/lowering cylinder pressure sensor 12, a swiveling angle sensor 13, a swiveling angular velocity sensor 14, a rope length sensor 15, an outrigger extension length sensor 16 and a vehicle body inclination sensor 17, are attached to the vehicular crane 1 in respective specified positions. Moreover, the boom raising/lowering cylinder pressure sensor detects the inertial moment of the load and load moment by detecting the pressure of the boom raising/lowering cylinder.

Figure 1:
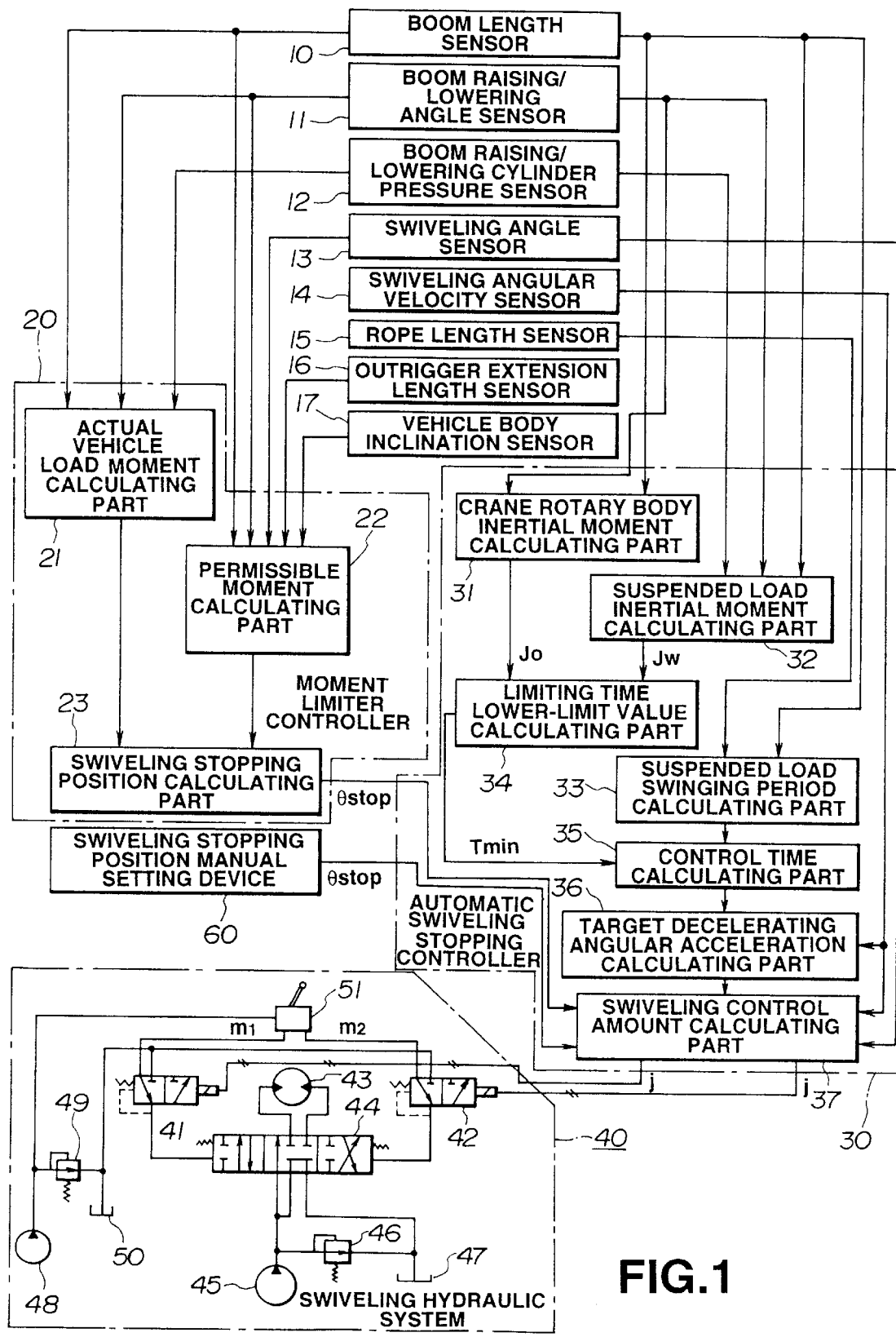
FIG. 1 is a block diagram which illustrates an embodiment of the present invention.

FIG. 1 shows a block diagram of the system used to stop the swiveling of the vehicular crane.

First, a swiveling hydraulic system 40 which is used to stop the swiveling of the rotary body of the crane is formed from electromagnetic proportional pressure reduction valves (EPC valves) 41, 42, a swiveling hydraulic motor 43, a directional control valve 44, a main pump 45, a main relief valve 46, a tank 47, a charging pump 48, a relief valve 49, a tank 50 and a manually operated valve (PPC valve) 51.

In the case of ordinary manual swiveling operation, operation of the lever of the PPC valve 51 causes secondary pressures that are proportional to the lever operating stroke S to be generated in the hydraulic lines m1 and m2. These secondary pressures move the spool of the directional control valve 44 via the EPC valves 41, 42 so that the flow rate into the swiveling motor 43 is controlled, thus controlling the stopping of the swiveling motion.

Furthermore, a control current command i is input into the EPC valves 41, 42 from the swiveling control amount calculating part 37 of an automatic swiveling stopping controller 30, so that swiveling stopping control can be accomplished by means of the control current command i. Specifically, if the input current i to the EPC valves 41, 42 is varied, the secondary pressures of the PPC valve 51 in the hydraulic lines m1, m2 are reduced in accordance with the input current i, and these reduced pressures are transmitted to the directional control valve 44. Accordingly, even in cases where the manual operating stroke S is large, the automatic swiveling stopping controller 30 can control swiveling on the deceleration side.

A moment limiter controller 20 is formed from an actual vehicle load moment calculating part 21, a permissible moment calculating part 22 and a swiveling stopping position calculating part 23. The actual vehicle load moment calculating part 21 calculates the actual vehicle load moment for the current state of the vehicle based on the outputs of the boom length sensor 10, boom raising/lowering angle sensor 11 and boom raising/lowering cylinder pressure sensor 12.

The permissible moment calculating part 22 calculates the permissible moment for the current state of the vehicle based on the outputs of the boom length sensor 10, boom raising/lowering angle sensor 11, swiveling angle sensor 13, outrigger extension length sensor 16 and vehicle body inclination sensor 17.

Figure 4:
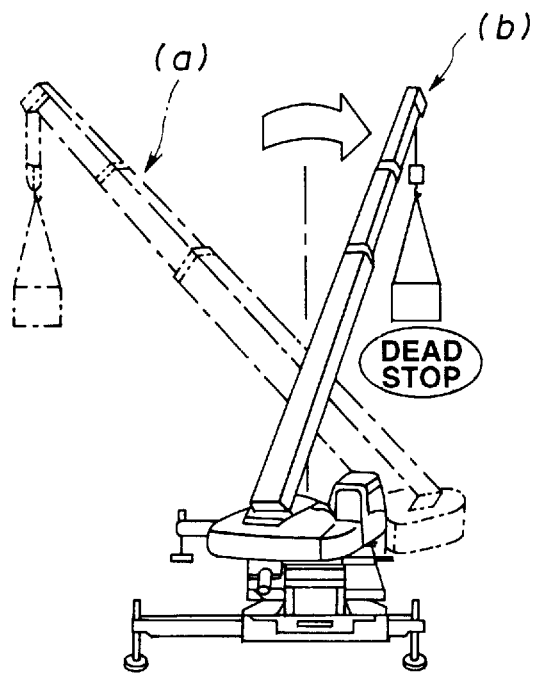
FIG. 4 is a diagram which illustrates the swiveling and stopping of the crane.

Now, as is shown in FIG. 4, let us consider a case in which the rotary body of the crane which has performed a steady swiveling motion to the right from position (a) with no swinging of the load is stopped in position (b) without any swinging of the load.

Figure 5:
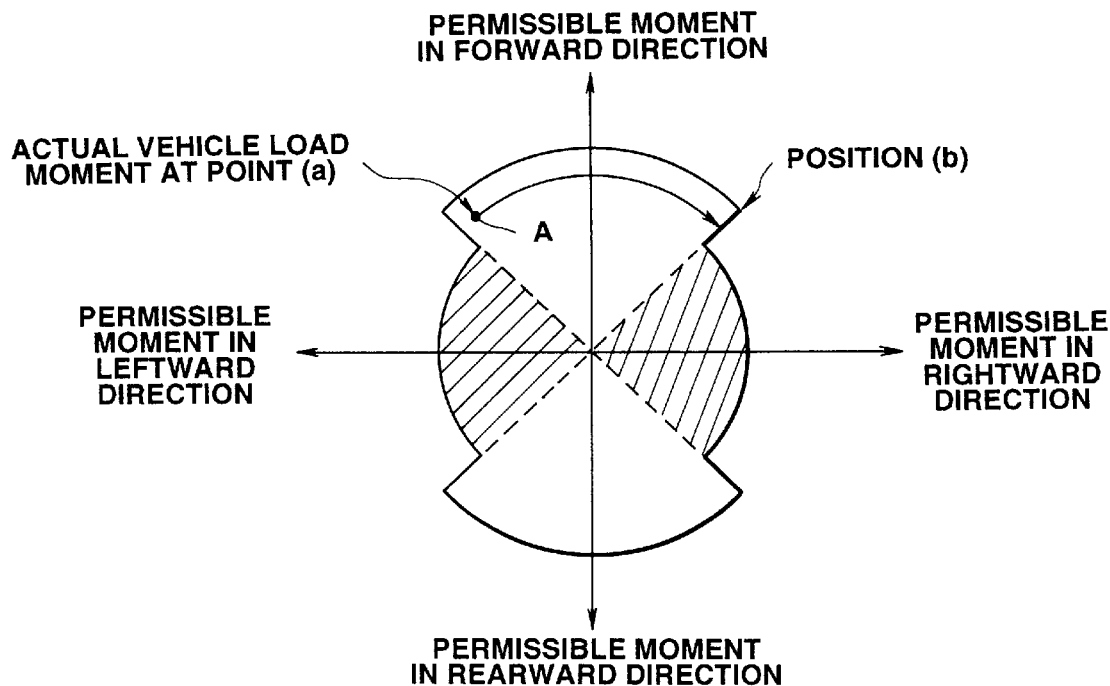
FIG. 5 is a diagram which shows the relationship between the load moment and the permissible moment.

FIG. 5 shows the overturning limit of the moment of the vehicle body (permissible moment) as viewed from above the vehicle body. The angular regions indicated by hatching are regions in which the permissible moment value is small compared to that in other regions. Furthermore, assuming that the actual vehicle load moment at position (a) in FIG. 4 has the value indicated by point A in FIG. 5, then, if the rotary body of the crane is caused to swivel to the right without altering the current state of the vehicle, the actual vehicle load moment will exceed the permissible moment at position (b).

In the swiveling stopping position calculating part 23 of the moment limiter controller 20 shown in FIG. 1, the actual vehicle load moment calculated by the actual vehicle load moment calculating part 21 and the permissible moment calculated by the permissible moment calculating part 22 are compared; swiveling angles judged to be dangerous (e. g., position (b) in FIG. 5) are ascertained, and the target value θstop of the angular stopping position is determined. The target angular stopping position θstop thus determined is input into the automatic swiveling stopping controller 30.

Furthermore, a swiveling stopping position manual setting device 60 allows an arbitrary stopping angle to be set manually by the operator. This set stopping angle θstop is input into the automatic swiveling stopping controller 30 in the same manner as the target angular stopping position θstop output from the moment limiter controller 20.

The automatic swiveling stopping controller 30 is formed from a crane rotary body inertial moment calculating part 31, a suspended load inertial moment calculating part 32, a suspended load swinging period calculating part 33, a limiting time lower-limit value calculating part 34, a control time calculating part 35, a target decelerating angular acceleration calculating part 36 and a swiveling control amount calculating part 37.

The crane rotary body inertial moment calculating part 31 calculates the attitude of the crane boom from the outputs of the boom length sensor 10 and boom raising/lowering angle sensor 11, and thus calculates the inertial moment JO of the rotary body of the crane.

The suspended load inertial moment calculating part 32 determines the weight of the suspended load and the suspension radius (swiveling radius) of the suspended load from the outputs of the boom length sensor 10, boom raising/lowering angle sensor 11 and boom raising/lowering cylinder pressure sensor 12, and calculates the inertial moment Jw of the suspended load on the basis of these values.

As was shown in Equation (1) above, the dynamic characteristics of the swiveling angle control system vary according to JO and Jw. Accordingly, the relationship of JO, Jw and the lower-limit value Tmin [sec] of the control time is determined beforehand by experiment, and a table map indicating the correspondence of these values is stored in the limiting time lower-limit calculating part 34. In the limiting time lower-limit value calculating part 34, the limiting time lower-limit value Tmin corresponding to the input values of JO and Jw is read from the table map, and this Tmin value is output to the limiting time calculating part 35.

Furthermore, the suspended load swinging period calculating part 33 calculates the rope length L from the boom tip to the suspended load on the basis of the rope length detected by the rope length sensor 15 and the boom length detected by the boom length sensor 10, and calculates the period T [sec] of the suspended load according to the following equation:

$$T = 2\pi \frac{L}{g} \quad (2)$$

Here, g indicates gravitational acceleration.

Using the Tmin value calculated by the limiting time lower-limit value calculating part 34 and the swinging period T of the suspended load calculated by the suspended load swinging period calculating part 33, the control time calculating part 35 selects the smallest natural number n which is such that the following Equation (3) holds true:

$$nT \geq Tmin \quad (3)$$

Using the value of n thus selected, the control time calculating part 35 determines nT as the control time Tc. The control time Tc (=nT) thus determined is input into the target decelerating acceleration calculating part 36.

Using the control time Tc (=nT) thus input, the target decelerating acceleration calculating part 36 calculates the target decelerating angular acceleration α according to the following Equation (4):

$$\alpha = -\Omega O/nT \quad (4)$$

Here, ΩO is the swiveling angular velocity [deg/sec] immediately prior to the initiation of automatic swiveling stopping control.

Using the values of ΩO, α and nT calculated by the target decelerating angular acceleration calculating part 36, the target stopping angle θstop input from the swiveling stopping position calculating part 23 or swiveling stopping position manual setting device 60, the actual swiveling angle θreal output by the swiveling angle sensor 13 and the actual swiveling angular velocity Ωreal output from the swiveling angular velocity sensor 14, the swiveling control amount calculating part 37 calculates the control current amount i for the electromagnetic proportional pressure reduction valves (EPC valves) 41, 42 as shown below, and controls the EPC valves 41, 42 in accordance with the calculated control current i.

Specifically, when $(nT·\Omega real)/2 < |\theta stop - \theta real|$, $i=0$, and no particular control is performed with respect to the EPC valves 41, 42.

Figure 6:
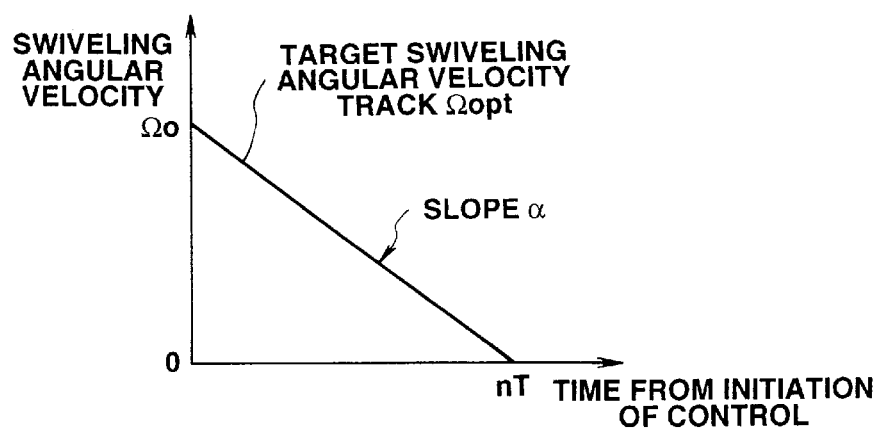
FIG. 6 is a graph which shows one example of a target swiveling angular velocity track.
Figure 7:
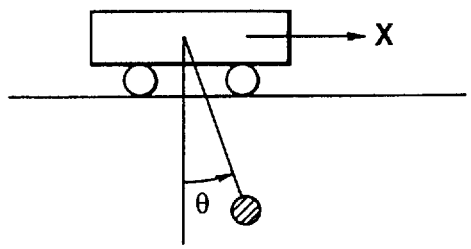
FIG. 7 is a diagram which illustrates prior art.
Figure 8:
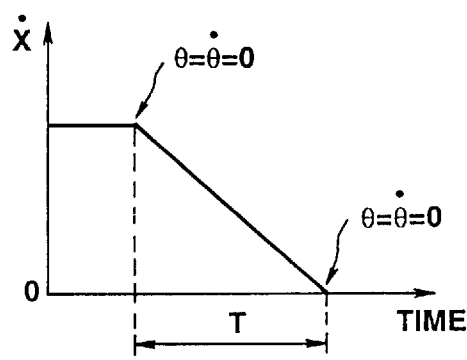
FIG. 8 is a graph which illustrates prior art.

However, at the point in time where $(nT·\Omega real)/2 \geq |\theta stop - \Omega real|$, control is initiated with respect to the EPC valves 41, 42; specifically, a target swiveling angular velocity track $\Omega opt$ such as that shown in FIG. 6 is immediately generated using the target decelerating acceleration $\alpha$ determined by the target decelerating acceleration calculating part 36, and feedback control of the swiveling angular velocity is performed in accordance with the angular velocity track thus generated.

More specifically, the current swiveling angular velocity $\Omega real$ is input from the swiveling angular velocity sensor 14, and the error between this angular velocity and the target swiveling angular velocity track $\Omega opt$ generated as described above is calculated. A control current value i (indicated by the following equation) which is such that this error is zero is then calculated.

$$i = K(\Omega real - \Omega opt)$$

Here, K is a specified constant.

As a result, the rotary body of the crane is decelerated and stopped in accordance with the target swiveling angular velocity track $\Omega opt$ shown in FIG. 6.

INDUSTRIAL APPLICABILITY

The present invention is useful when applied to techniques for automatically stopping the swiveling operation of rotary cranes without swinging of the load.

I claim:

1. A control device for automatically stopping the swiveling of a crane in which a boom is attached to a rotary body and a load is suspended from a tip end of the boom, comprising:

first measurement means for measuring an inertial moment of the rotary body;

second measurement means for measuring an inertial moment of the load;

memory means in which a plurality of swiveling control lower-limit times Tmin, which are set so that vibration of the boom falls within an allowable range when the boom swivels, are stored beforehand in association with a plurality of different values of the inertial moment of the rotary body and the inertial moment of the load, and which outputs one swiveling control lower-limit time Tmin, from among the plurality of different swiveling control lower-limit times Tmin stored therein, which corresponds to the inertial moment of the rotary body and the inertial moment of the load that are output from the first and second measurement means;

third measurement means for measuring a swinging period T of the load;

deceleration time calculating means for calculating a smallest natural number n for which $nT \geq Tmin$ by using the swiveling control lower-limit time Tmin output from said memory means and the swinging period T output from said third measurement means, and for calculating a deceleration time nT obtain by multiplying swinging period T by the natural number n;

target deceleration angular velocity calculating means for calculating a target deceleration angular velocity $\alpha$(wherein $\alpha = -\Omega O/nT$ and $\Omega O$ is a swiveling angular velocity of the rotary body immediately prior to the initiation of automatic swiveling stopping control), based on the deceleration time nT output from said deceleration time calculating means; and braking and stopping control means for braking and stopping the rotary body with the target deceleration angular velocity $\alpha$ calculated by the target deceleration angular velocity calculating means.

2. A control device as defined in claim 1, wherein the first measurement means comprises:

a boom length detection sensor for detecting a boom length;

a boom raising/lowering angle detection sensor for detecting a boom raising/lowering angle; and calculating means for calculating the inertial moment of the rotary body based on outputs of said boom length detection sensor and said boom raising/lowering angle detection sensor.

3. A control device as defined in claim 1, wherein the boom is driven by a boom raising/lowering cylinder and wherein said second measurement means comprises;

a boom length detection sensor for detecting a boom length;

a boom raising/lowering angle detection sensor for detecting a boom raising/lowering angle;

cylinder pressure detection means for detecting a cylinder pressure of said boom raising/lowering cylinder; and calculating means for calculating the inertial moment of the rotary body based on outputs of said boom length detection sensor, said boom raising/lowering angle detection sensor and said cylinder pressure detection means.

4. A control device as defined in claim 1, wherein said third measurement means comprises:

a rope length detection sensor for detecting a length of a rope from one end of the boom to the load; and calculating means for calculating the swinging period T of the load based on an output of said rope length detection sensor.

5. A control device as defined in claim 1, further comprising:

fourth measurement means for measuring a load moment of the crane;

fifth measurement means for measuring a permissible moment of the crane; and angular stopping position calculating means for calculating an angular stopping position at which the crane is to be stopped to avoid an area where the load moment exceeds the permissible moment by comparing outputs of the fourth and fifth measurement means, wherein said braking and stopping control means controls the crane so that the crane is stopped in the angular stopping position calculated by said angular stopping position calculating means.

* * * * *